United States Patent [19]

Akami

[11] Patent Number: 5,510,206

[45] Date of Patent: Apr. 23, 1996

[54] BATTERY LOADING MECHANISM OF CAMERA

[75] Inventor: Noboru Akami, Yokohama, Japan

[73] Assignee: Nikon Corporation, Tokyo, Japan

[21] Appl. No.: 311,851

[22] Filed: Sep. 26, 1994

[30] Foreign Application Priority Data

Sep. 27, 1993 [JP] Japan .................................. 5-239734

[51] Int. Cl.$^6$ ............................ H01M 2/10; H01M 2/00
[52] U.S. Cl. ................................ 429/100; 429/1; 429/123
[58] Field of Search ............................ 429/1, 100, 123

[56] References Cited

U.S. PATENT DOCUMENTS

| | | | |
|---|---|---|---|
| 3,856,577 | 12/1974 | Oki et al. | 429/123 |
| 5,149,598 | 9/1992 | Sunshine | 429/1 |
| 5,194,340 | 3/1993 | Kosako | 429/1 |
| 5,229,220 | 7/1993 | Stanton et al. | 429/1 |

*Primary Examiner*—Prince Willis, Jr.
*Assistant Examiner*—Carol Chaney

[57] ABSTRACT

A battery loading mechanism requires that a battery is inserted with a positive electrode terminal inserted first into a battery chamber. The battery chamber is formed with a space into which the battery is inserted from an insertion port opened outside. A positive-side electrical contact is provided in an inner part, opposite to the insertion port, of the battery chamber, and a negative-side electrical contact is provided on a side of the insertion port of the battery chamber. The positive-side electrode has a contact point contacting the positive electrode terminal of the battery and a preventive portion contacting the non-conductor portion when the battery is inserted with the negative electrode terminal first. The contact point does not contact the negative electrode terminal when the preventive portion contacts the non-conductor portion to reduce accidental discharge of the battery.

6 Claims, 3 Drawing Sheets

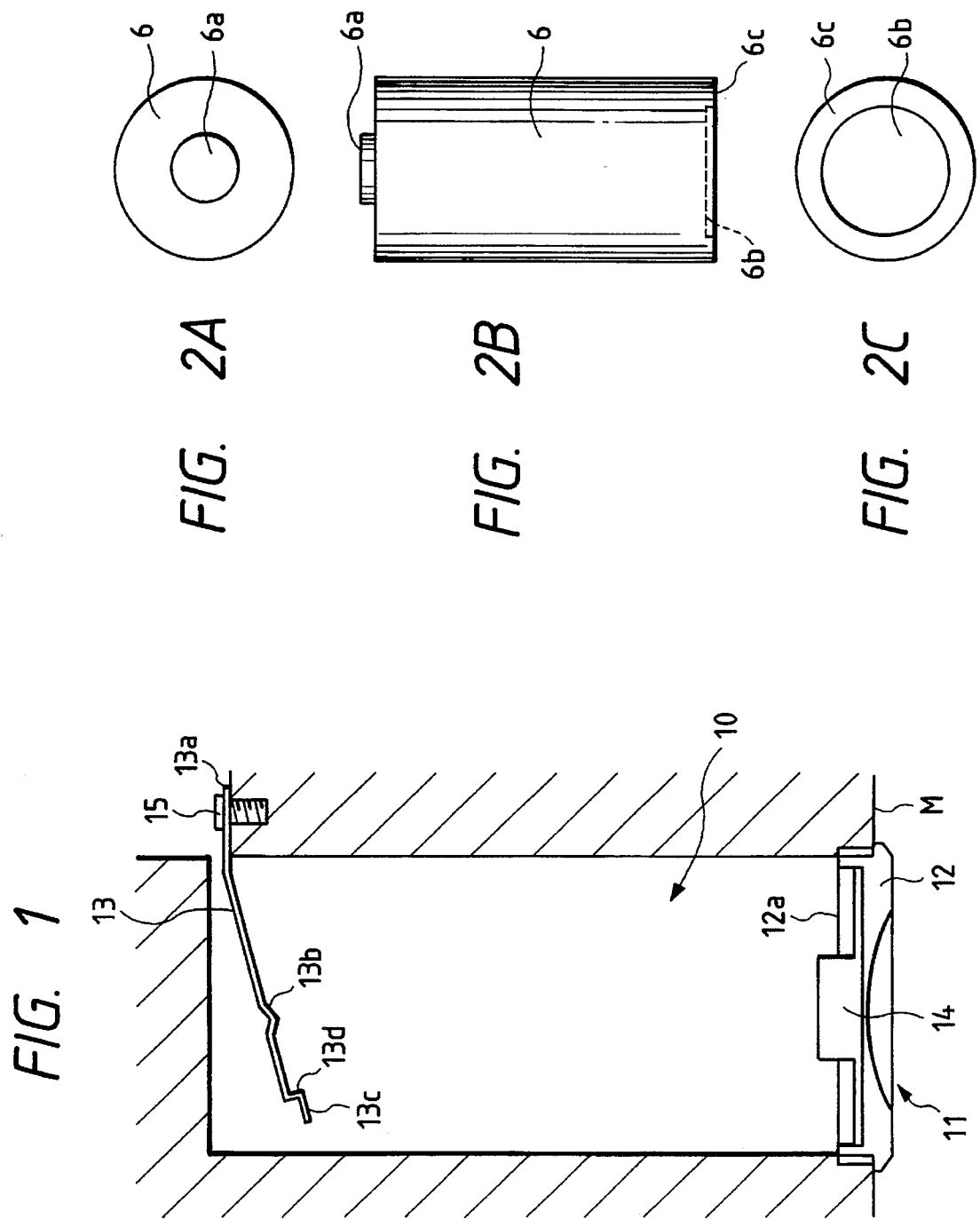

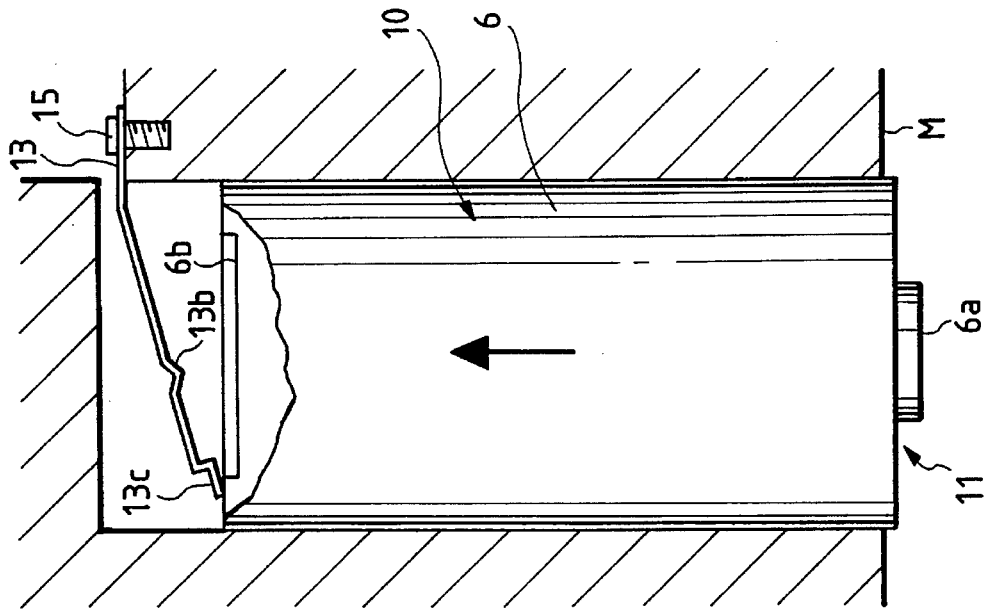
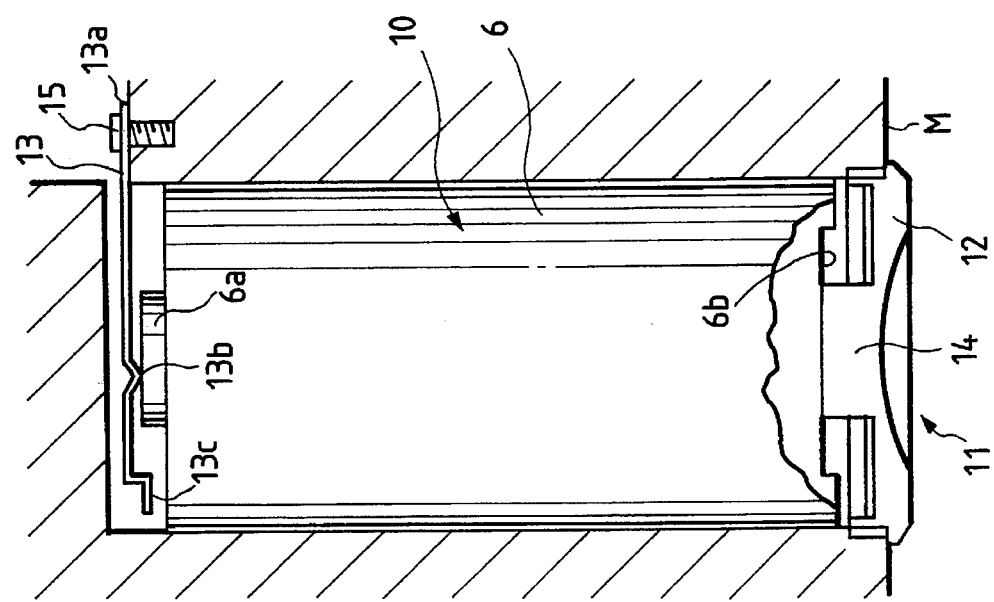

BATTERY LOADING MECHANISM OF CAMERA

BACKGROUND OF THE INVENTION

1. Field of the Invention

The present invention relates to a battery loading mechanism for loading a battery such as, e.g., a 3 V lithium battery or the like into a camera.

2. Related Background Art

FIG. 6 illustrates, e.g., this type of conventional battery loading mechanism of a camera. Referring to FIG. 6, a battery chamber 1 is so formed in a camera body M as to have a size corresponding to a loadable battery. An insertion port 2 is formed on one end (lower side in FIG. 6) of the battery chamber 1 and may be opened from outside of battery chamber 1. This insertion port 2 is covered with an openable/closable battery cover 3. A negative electrode contact member 4 is provided on the other end side (upper side in FIG. 6), i.e., on an inner side opposite to the insertion port 2. On the other hand, a positive electrode contact member 5 is provided inwardly of the battery cover 3. In an example shown in FIG. 6, the negative electrode contact member 4 is composed of a conical coil spring or a plate spring. The positive electrode contact member 4 is composed of a conductor plate.

FIGS. 2A to 2C Prior Art illustrate a conventional battery which may be loaded by the battery loading mechanism shown in FIG. 6. Referring to FIGS. 2A to 2C, the numeral 6 designates a battery such as, e.g., a 3 V lithium battery or the like. The battery 6 has a positive electrode terminal 6a protruding from one end portion (upper end portion in FIG. 2B). A negative electrode terminal 6b is so provided as to be recessed in the other end portion (lower end portion in FIG. 2B) of the battery 6. The other end portion, exclusive of the negative electrode terminal 6b, of the battery is a non-conductor portion 6c.

With reference now to FIGS. 2A–2C and FIG. 6, the battery 6 illustrated in FIGS. 2A to 2C is inserted into the mechanism of FIG. 6 from an insertion port 2 and loaded into the battery chamber 1 with its negative electrode terminal 6b inserted first. When the insertion port 2 is closed by the battery cover 3 after the battery 6 has been loaded into the battery chamber 1, the negative electrode terminal 6b of the battery 6 contacts the negative electrode contact member 4, while the positive electrode terminal 6a contacts the positive electrode contact member 5. Then, a predetermined contact-point pressure is obtained when the negative electrode contact member 4 is elastically deformed by the negative electrode terminal 6b. Further, when the battery cover 3 is opened to replace the battery, the battery 6 is ejected out of the insertion port 2 by a spring force from the negative electrode contact member 4, and, thus, the battery can be easily replaced.

On the other hand, when the battery 6 is loaded with the positive electrode terminal 6a inserted first, the positive electrode terminal 6a can be brought into contact with the negative electrode contact member 4. However, since the negative electrode terminal 6b is so formed as to be more recessed than the non-conductor member 6c, the positive electrode contact member 5 is not allowed to contact the negative electrode terminal 6b. The electric circuit is thereby protected without charging the electric circuit of the camera with the electricity, even when the battery 6 is loaded in the reverse direction.

If the camera is equipped with a metal casing, it is preferable that the casing is grounded (GND), and, therefore, that the battery 6 is loaded with the positive electrode terminal 6a inserted first. In this case, when the construction shown in FIG. 6 is applied, it follows that the positive electrode contact member 5, composed of a conductor plate, is provided in the inner part of the battery chamber. It also follows that the battery cover 3 is provided with a conical coil spring and the negative electrode contact member 4 is composed of a plate spring.

If the coil spring and the plate spring protrude from the battery cover 3, there exists a possibility in which the coil spring or the like (negative electrode contact member 4) are caught by clothes of the photographer when replacing the battery 6 by opening the battery cover 3, and this hiders the replacement of the battery. Further, the positive electrode contact member 5 composed of the conductor plate is provided in the inner part of the battery chamber 1, and hence, there can not be obtained such an effect that the battery 6 is, as in the case of the structure shown in FIG. 6, ejected out of the insertion port 2 when opening the battery cover 3.

SUMMARY OF THE INVENTION

It is a primary object of the present invention to provide a battery loading mechanism of a camera which is constructed such that a negative-side electrode does not hinder a replacement of a battery in the battery loading mechanism of such a type that the battery is inserted with a positive electrode terminal first.

It is another object of the present invention to provide a battery loading mechanism of a camera which is capable of simply replacing a battery in the battery loading mechanism of such a type that the battery is inserted with a positive electrode terminal first.

The present invention is applied to a camera battery loading mechanism for loading a battery which is constructed such that a positive electrode terminal protrudes from one end portion. A negative electrode terminal is so formed as to be recessed in the other end portion, and the other end portion exclusive of the negative electrode terminal is a non-conductor portion.

Then, the above objects are accomplished by the following construction. The battery loading mechanism comprises: a battery chamber, formed with a space for housing the battery, into which the battery is inserted from an insertion port opened outside with its positive electrode terminal inserted first; a positive-side electrode provided in an inner part, opposite to the insertion port, of the battery chamber; and a negative-side electrode provided on the side of the insertion port of the battery chamber. The positive-side electrode has a contact point contacting the positive electrode terminal of the battery and a preventive portion contacting the non-conductor portion when the battery is inserted with the negative electrode terminal inserted first. The contact point does not contact the negative electrode terminal when the preventive portion contacts the non-conductor portion.

The positive-side electrode may be constructed of a plate spring which is bendable in an inserting direction of the battery and having its one end fixed inwardly of the battery chamber. In addition, the preventive portion is constructed of a convex portion protruding toward the insertion port formed on the side of the other end portion of the plate spring, and a quantity of the protrusion may be set smaller than a quantity of the protrusion of the positive electrode terminal.

When the battery is inserted into the battery chamber with the negative electrode terminal inserted first, the non-conductor portion existing on the other end of the battery contacts the preventive portion, whereby the contact point is not allowed to contact the negative electrode terminal.

When the battery is inserted into the battery chamber, the plate spring constituting the positive-side electrode is bent. When taking out the battery, this battery is ejected out of the battery chamber by a biasing force consistent with this bending.

When the battery is inserted into the battery chamber with the negative electrode terminal consistent, the battery is protruded outwardly by the quantity of the protrusion of the preventive portion as compared with a case where the battery is inserted into the battery chamber with the positive electrode terminal inserted first.

BRIEF DESCRIPTION OF THE DRAWINGS

Other objects and advantages of the present invention will become apparent during the following discussion in conjunction with the accompanying drawings, in which:

FIG. 1 is a sectional view illustrating a battery loading mechanism of a camera in one embodiment of the present invention;

FIGS. 2A to 2C Prior Art are views each showing a battery applied to one embodiment; FIG. 2A is a plan view; FIG. 2B is a front view; FIG. 2C is a bottom view;

FIG. 3 is a sectional view of assistance in explaining the operation of one embodiment but illustrating a state where the battery is inserted with a positive electrode terminal inserted first;

FIG. 4 is a view of assistance in explaining the operation of one embodiment but illustrating a state where the battery is inserted with a negative electrode terminal inserted first;

DESCRIPTION OF THE PREFERRED EMBODIMENTS

Figure 6:
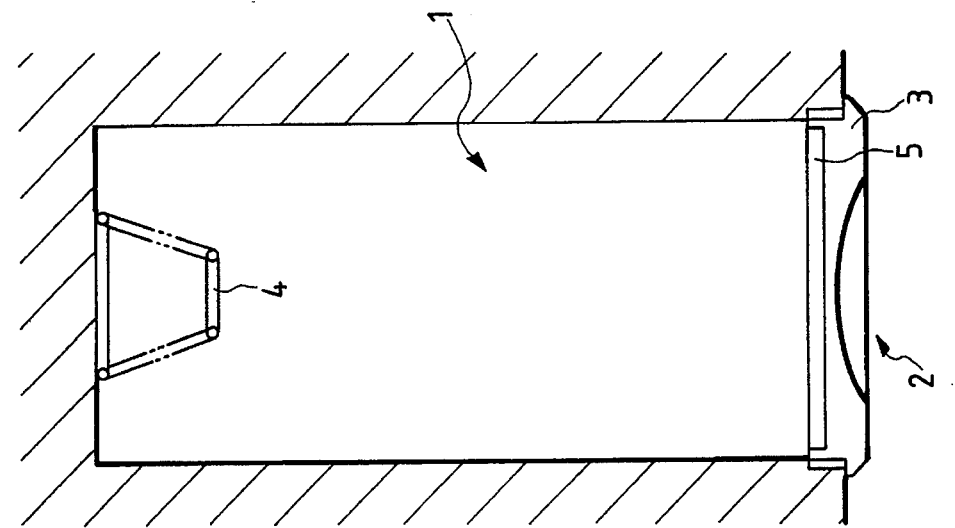
FIG. 6 Prior Art is a sectional view showing one example of a battery loading mechanism of a camera in the prior art.

FIG. 1 is a sectional view illustrating a battery loading mechanism of a camera in one embodiment of the present invention. The battery loading mechanism of the camera in this embodiment also, as in the same way with the conventional battery loading mechanism shown in FIG. 6, loads a battery 6 having a construction shown in FIGS. 2A to 2C. A different point in the battery loading mechanism in this embodiment is, however, such that the battery 6 is loaded from an insertion port into a battery chamber with its positive electrode terminal 6a inserted first.

Referring to FIG. 1, a battery chamber 10 is so formed in a camera body M as to have a size corresponding to the battery 6. An insertion port 11, opened from outside camera body M, is formed on one end (lower side in FIG. 1) of the battery chamber 10. This insertion port 11 is covered with an openable/closable battery cover 12.

A positive electrode contact member 13 is provided on the other end side (upper side in FIG. 1), i.e., on an inner side opposite to the insertion port 11. This positive electrode contact member 13 is composed of a metal plate spring. One end portion 13a thereof is fixed to the camera body M with a fastening screw 15, and a portion other than the one end portion 13a is slightly bent toward the insertion port 11. A contact point 13b contacting the positive electrode terminal 6a of the battery 6 is protruded at the central part of the positive electrode contact member 13. Further, the other end portion 13c of the positive electrode contact member 13 is more protruded toward the insertion port 11 through a stepped portion 13d than the contact point 13b. The other end portion 13c is, as will be stated later, disposed in such a position as to contact a non-conductor portion 6c of the battery 6 when the battery 6 is inserted from the insertion port 11 with a negative electrode terminal 6b inserted first. Further, a difference in level between the other end portion 13c and the contact point 13b is set smaller than a quantity of protrusion of the positive electrode terminal 6a of the battery 6.

On the other hand, a negative electrode contact member 14 is provided inwardly of the battery cover 12. In this embodiment, the negative electrode contact member 14 is composed of cylindrical metal protruding from an inner surface 12a of the battery cover 12. A diameter of the negative electrode contact member 14 is set smaller than a diameter of the negative electrode terminal 6b of the battery 6. Additionally, a quantity of protrusion from the inner surface 12a of the battery cover is set larger than a quantity of recess (difference in level from the non-conductor portion 6c) of the negative electrode terminal 6b.

The positive electrode contact member 13 and the negative electrode contact member 14 are connected via unillustrated connecting lines to an electric circuit of the camera.

Next, the operation will be discussed.

FIG. 3 is a view illustrating a state where the battery 6 is inserted from the insertion port 11 into the battery chamber 10 with the positive electrode terminal 6a inserted first. The portion other than the one end portion 13a of the positive electrode contact member 13 is bent upward in FIG. 3 when the positive electrode terminal 6a contacts the contact point 13b and is inserted more inward. Then, when the insertion port 11 is closed by the battery cover 12 after the battery 6 has been inserted to the inner part of the battery chamber 10, the contact point 13b of the positive electrode contact member 13 contacts the positive electrode terminal 6a, and the negative electrode contact member 14 is brought into a contact with the negative electrode terminal 6b. In this way, the respective terminals 6a, 6b of the battery 6 are connected to the electric circuit of the camera. On this occasion, the level-difference of the other end portion 13c of the positive electrode terminal 13 is set smaller than the quantity of protrusion of the positive electrode terminal 6a, and, therefore, the other end portion 13c neither contacts the battery 6 nor becomes an obstacle against the loading of the battery 6. When the battery cover 6 is opened thereafter, a spring force caused by the flexure of the positive electrode contact member 13 acts on the battery 6, with the result that this battery 6 is ejected out of the insertion port 11.

Figure 5:
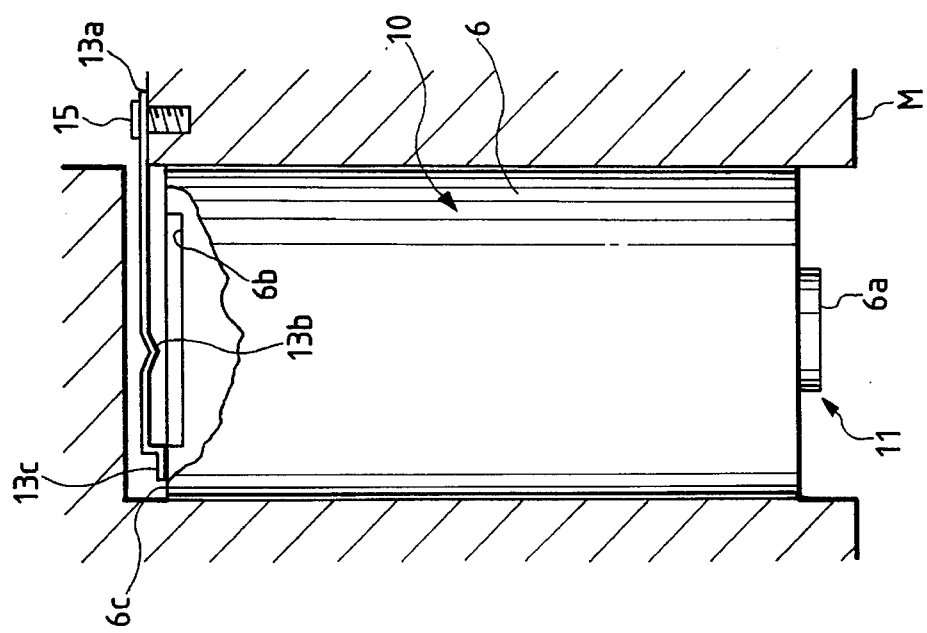
FIG. 5 is a view of assistance in explaining the operation of one embodiment but illustrating a state where the battery is inserted with the negative electrode terminal.

On the other hand, FIG. 4 is a view depicting an in-process state where the battery 6 is going to be inserted and loaded from the insertion port into the battery chamber 10 with the negative electrode terminal 6b inserted first. FIG. 5 is a view illustrating a state where the battery 6 has completely been inserted into the battery chamber 10. When the battery 6 is inserted into the battery chamber 10, the other end portion 13c of the positive electrode contact member 13, at first, contacts the non-conductor portion 6c of the battery 6. Then, the positive electrode contact member 13 is bent upward in FIG. 5 while keeping the contact state between the other end portion 13c and the non-conductor portion 6c. Subsequently, even when the battery 6 is inserted to the inner part of the battery chamber 10, the other end portion 13c is more protruded than the contact point 13b, and hence the contact point 13b does not contact the negative electrode terminal 6b at all. With this construction, the electric circuit of the camera is prevented from being charged with electricity. Besides, as compared with the case of FIG. 3, the end portion of the battery 6 on the side of the insertion port 11 is protruded outward by the quantity of protrusion of the other end portion 13c, and, therefore, the battery cover 12 can not close the insertion port 11. Accordingly, mis-loading of the battery can be prevented.

Note that the details of the battery loading mechanism of the camera according to this invention are not limited to one embodiment discussed above, but a variety of modifications can be carried out.

As fully discussed above, according to the present invention, in the battery loading mechanism of such a type that the battery is inserted into the battery chamber with its positive electrode terminal inserted first, the function to prevent the mis-loading is given to the positive-side electrode. Therefore, the negative-side electrode on the opposite side can take the simple configuration and construction as in the form of the plate-like member, and the negative-side electrode does not hinder the replacement of the battery.

Also, according to the present invention, the battery can be ejected by the biasing force consistent with the flexure of the plate spring, thereby simplifying the replacement of the battery.

It is apparent that, in this invention, a wide range of different working modes can be formed based on the invention without deviating from the spirit and scope of the invention. This invention is not restricted by its specific working modes except being limited by the appended claims.

What is claimed is:

1. A camera battery loading mechanism for loading a battery in an axial direction, said battery having a positive electrode terminal protruding from a proximal end portion, a negative electrode terminal recessed in a distal end portion, and the distal end portion including a non-conductor portion exclusive of the negative electrode terminal, said loading mechanism comprising:

a battery chamber, formed with a space for housing the battery, into which the battery is inserted from an insertion port opened to the outside with the positive electrode terminal inserted first;

a positive-side electrical plate spring bendable toward the inserting direction of the battery, provided in an inner part opposite to the insertion port of said battery chamber and having one end fixed inwardly of said battery chamber, wherein said plate spring is bent to generate a biasing force which ejects the battery from an insertion opening to the outside thereof; and a negative-side electrical contact provided inside a battery cover and connecting with the negative electrode terminal of the battery;

wherein said positive-side electrical plate spring has a contact point contacting the positive electrode terminal of the battery when the battery is inserted positive terminal first and a preventive portion contacting the non-conductor portion when the battery is inserted negative electrode terminal first, and said contact point does not contact the negative electrode terminal when said preventive portion contacts the non-conductor portion.

2. The camera battery loading mechanism according to claim 1, wherein said preventive portion is a protruded portion extending towards the insertion port, and said contact point is a protruded portion extending towards the insertion port.

3. A camera battery loading mechanism for securing a camera battery, said battery having a protruding positive electrode terminal and a recessed negative electrode terminal surrounded by an insulating layer disposed about the periphery thereof, wherein the loading mechanism is housed within a camera body having a cylindrical battery chamber and a battery cover disposed over a proximal end of the battery chamber, said loading mechanism comprising:

a positive battery terminal contact member disposed at a distal end of the cylindrical battery chamber and having a raised contact point about a center of the cylindrical chamber wherein said positive contact member has a raised stepped portion at a distal end thereof which is so configured and arranged to contact the insulating layer disposed about the periphery of the recessed negative electrode thereby preventing contact of the positive contact member with the recessed negative electrode terminal.

4. The camera loading mechanism according to claim 3 further comprising:

a negative battery terminal contact member connected to the battery cover and contacting the recessed negative electrode terminal of the camera battery upon placement of the battery cover over the proximal end of the battery chamber.

5. The camera loading mechanism according to claim 3, wherein a proximal end of said positive battery terminal contact member is affixed to a side of the battery chamber and the distal end of the positive contact terminal is deformed towards the proximal end of the battery chamber to thereby impart ejection of the camera battery from the battery chamber upon removal of the battery cover.

6. A camera battery loading mechanism for securing a camera battery, said battery having a protruding positive electrode terminal disposed at a distal end thereof, and a recessed negative electrode disposal at a proximal end thereof wherein the camera battery is selectably insertable into a battery chamber of a camera body, said camera loading mechanism comprising:

a positive battery terminal contact member disposed at a distal end of said battery chamber and connected to a sidewall of the battery chamber by a proximal end thereof, wherein said contact member has a raised center contact point which contacts the protruding positive electrode terminal of the battery upon insertion thereof and a raised stepped portion at a distal end thereof which prohibits contact with the recessed negative electrode of the battery upon insertion into the battery chamber.

* * * * *